United States Patent
Iemura et al.

(10) Patent No.: US 12,036,486 B2
(45) Date of Patent: Jul. 16, 2024

(54) PACKING MATERIAL FOR ION CHROMATOGRAPHY AND PRODUCTION METHOD THEREFOR

(71) Applicant: SHOWA DENKO K.K., Tokyo (JP)

(72) Inventors: Shiho Iemura, Tokyo (JP); Naoko Uchiyama, Tokyo (JP)

(73) Assignee: Resonac Corporation, Tokyo (JP)

( * ) Notice: Subject to any disclaimer, the term of this patent is extended or adjusted under 35 U.S.C. 154(b) by 756 days.

(21) Appl. No.: 17/268,623

(22) PCT Filed: Jul. 11, 2019

(86) PCT No.: PCT/JP2019/027539
§ 371 (c)(1),
(2) Date: Feb. 16, 2021

(87) PCT Pub. No.: WO2020/044813
PCT Pub. Date: Mar. 5, 2020

(65) Prior Publication Data
US 2021/0237034 A1    Aug. 5, 2021

(30) Foreign Application Priority Data
Aug. 31, 2018  (JP) .................................. 2018-162434

(51) Int. Cl.
*B01D 15/36* (2006.01)
*B01J 20/28* (2006.01)
(Continued)

(52) U.S. Cl.
CPC .......... *B01D 15/363* (2013.01); *B01J 20/285* (2013.01); *B01J 20/289* (2013.01);
(Continued)

(58) Field of Classification Search
CPC .... B01D 15/363; B01D 15/361; B01J 20/285; B01J 20/289; B01J 20/3042;
(Continued)

(56) References Cited

U.S. PATENT DOCUMENTS 4,551,245 A * 11/1985 Ramsden ............... B01J 20/103
                                                    210/502.1
5,389,449 A    2/1995 Afeyan et al.
(Continued)

FOREIGN PATENT DOCUMENTS

CN     101146609 A  *  3/2008  ........... B01D 15/327
CN     101932688 A    12/2010
(Continued)

OTHER PUBLICATIONS

Kitagawa Publication: "Ion-Exchange Chromatography of Proteins on a Polyethyleneimine-Grafted Hydrophilic Polymer for High-Performance Liquid Chromatography", Journal of Chromatography, Published 1988, vol. 443, pp. 133-141. (Year: 1988 ).*
(Continued)

*Primary Examiner* — Joseph W Drodge
(74) *Attorney, Agent, or Firm* — Sughrue Mion, PLLC

(57) ABSTRACT

A packing material for ion chromatography has a structure in which a polyethyleneimine is bonded, directly or through a spacer, to a surface of an organic porous substrate constituted of a hydroxylated crosslinked copolymer, and a functional group represented by formula (1)

(1)

(Continued)

(wherein the symbols are as described in the description) is bonded to a nitrogen atom derived from the polyethyleneimine. The invention further relates to a production method of the packing material for ion chromatography and a column for ion chromatography. A packing material is provided for a column which exhibits a high separating performance in anion chromatography employing a hydroxide-based eluent, and a production method thereof is also provided.

20 Claims, 2 Drawing Sheets

(51) Int. Cl.
    *B01J 20/285* (2006.01)
    *B01J 20/289* (2006.01)
    *B01J 20/30* (2006.01)
    *C08L 29/04* (2006.01)
    *G01N 30/96* (2006.01)

(52) U.S. Cl.
    CPC ........... *B01J 20/3042* (2013.01); *C08L 29/04* (2013.01); *G01N 30/96* (2013.01)

(58) Field of Classification Search
    CPC .... B01J 20/3272; B01J 41/20; B01J 20/3212; B01J 20/3219; B01J 20/3293; B01J 20/286; B01J 20/3282; C08L 29/04; G01N 30/96; C09B 68/446; C08G 18/287
    See application file for complete search history.

(56) References Cited

U.S. PATENT DOCUMENTS

| | | | |
|---|---|---|---|
| 5,906,734 A * | 5/1999 | Girot | B01D 15/20 502/402 |
| 6,689,820 B2 | 2/2004 | Muranaka et al. | |
| 6,881,761 B2 | 4/2005 | Kotsuka et al. | |
| 7,291,395 B2 | 11/2007 | Pohl et al. | |
| 2002/0004535 A1 | 1/2002 | Kotsuka et al. | |
| 2002/0099104 A1 | 7/2002 | Muranaka et al. | |
| 2002/0194901 A1 | 12/2002 | Kotsuka et al. | |
| 2003/0066336 A1 | 4/2003 | Kotsuka et al. | |
| 2005/0181224 A1 | 8/2005 | Pohl et al. | |
| 2014/0311983 A1* | 10/2014 | Schwarz | B01J 20/28004 502/402 |
| 2016/0266134 A1* | 9/2016 | Marcus | B01J 20/3272 |

FOREIGN PATENT DOCUMENTS

| | | | |
|---|---|---|---|
| CN | 103974766 A * | 8/2014 | ........... B01J 20/286 |
| CN | 105396628 A | 3/2016 | |
| CN | 107413395 A | 12/2017 | |
| EP | 1226870 A1 | 7/2002 | |
| JP | 62-289238 A | 12/1987 | |
| JP | 6-504482 A | 5/1994 | |
| JP | 2002-219367 A | 8/2002 | |
| JP | 4207362 B2 | 1/2009 | |
| JP | 4659766 B2 | 3/2011 | |
| RU | 2014 105 928 A | 8/2015 | |
| RU | 2 627 384 C1 | 8/2017 | |
| WO | 2005/082534 A1 | 9/2005 | |

OTHER PUBLICATIONS

English Translation of Arendt et al.Publication CN103974766A, published Aug. 2014. (Year: 2014).*

English Translation of patent publication CN-101146609-A, published Mar. 19, 2008 (Year: 2008).*

Shchukina, O.I. et al., "Novel polymer-based anion-exchangers with covalently-bonded functional layers of quaternized polyethyleneimine for ion chromatography", Analytica Chimica Acta, 2017, 964, pp. 187-194 (8 pages total).

Chen, J. et al., "Thermo-/pH-dual responsive properties of hyperbranched polyethylenimine grafted by Phenylalanine", Archives of Pharmacal Research, 2014, 37, pp. 142-148 (7 pages total).

International Search Report dated Oct. 8, 2019 in Application No. PCT/JP2019/027539.

Written Opinion of the International Searching Authority dated Oct. 8, 2019 in Application No. PCT/JP2019/027539.

Wang, et al., "Preparation of Organic-Silica Hybrid Monolith with Anion Exchange/Hydrophilic Interaction Mixed-Mode Via Epoxy-Amine Ring-Opening Polymerization Using Polyethylenimine as Functional Monomer", Chromatographia, Jul. 2016, vol. 79, pp. 1263-1269 (7 pages total).

Huang, et al., "Preparation of Surface—grafted Stationary Phases for Ion Chromatography", Chinese Journal of Inorganic Analytical Chemistry, Sep. 2012, vol. 2, No. 3, pp. 55-57 (3 pages total).

Myung, et al., "Communication-Halide Ions in TEG-Based Levelers Affecting TSV Filling Performance", Journal of The Electrochemical Society, Feb. 2016, vol. 163, No. 5, pages D185-D187 (3 pages total).

Extended European Search Report issued Apr. 22, 2022 in European Application No. 19854421.5.

Rounds et al., "Poly(Styrene-Divinylbenzene)-Based Strong Anion-Exchange Packing Material for High-Performance Liquid Chromatography of Proteins", Journal of Chromatography, 1987, vol. 397, pp. 25-38 (14 pages total).

Zatirakha et al., "Methods for Preparing High Performance Stationary Phases for Anion-Exchange Chromatography", Moscow University Chemistry Bulletin, 2017, vol. 72, No. 6, pp. 289-302 (14 pages total).

* cited by examiner

[Fig. 1]
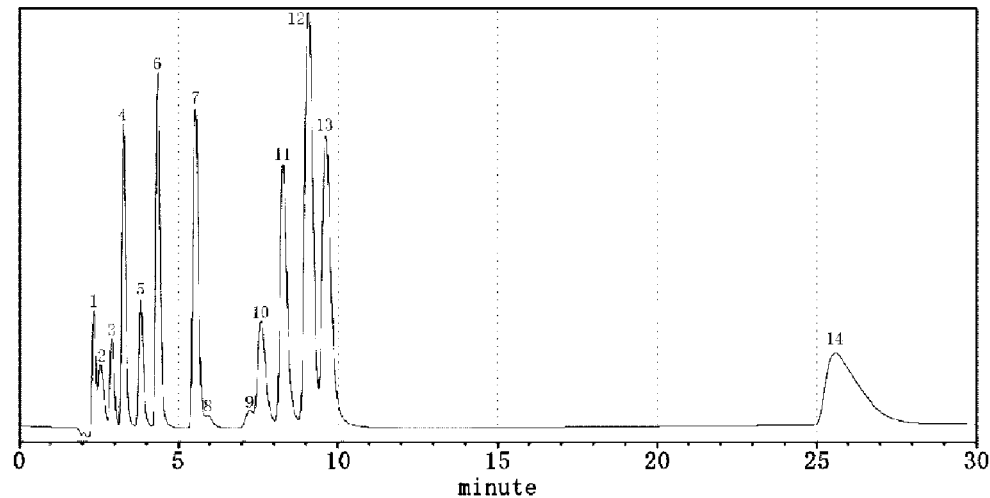
[Fig. 2]
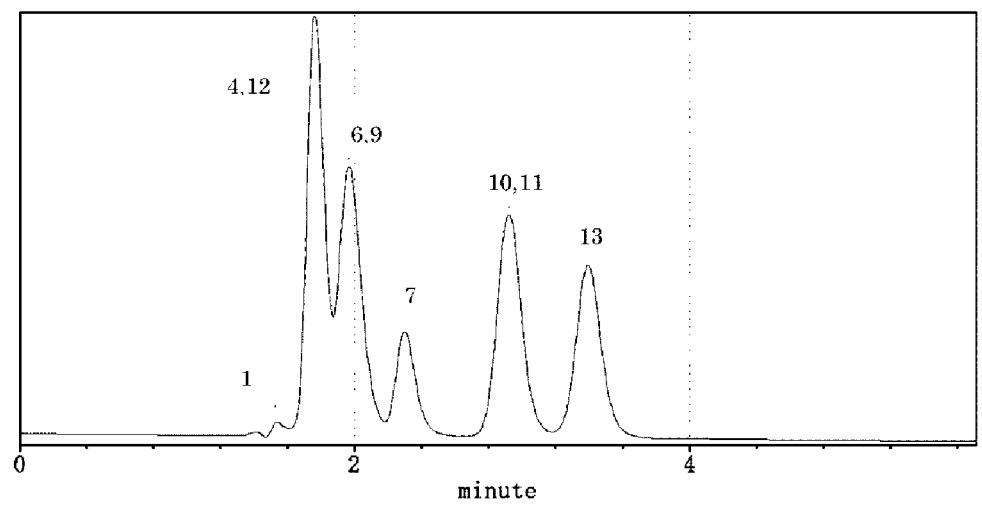

[Fig. 3]
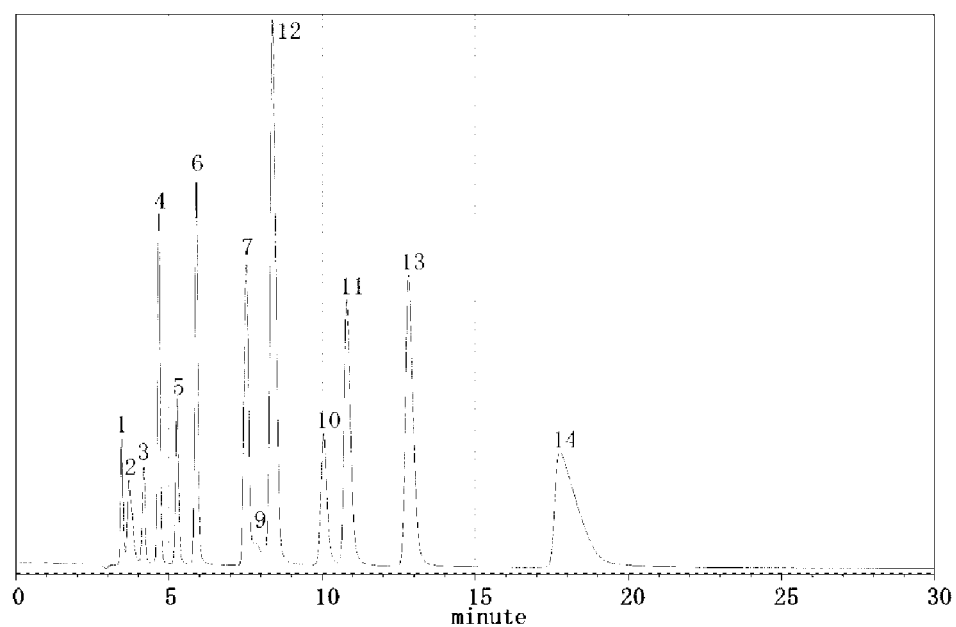

PACKING MATERIAL FOR ION CHROMATOGRAPHY AND PRODUCTION METHOD THEREFOR

CROSS REFERENCE TO RELATED APPLICATIONS

This application is a National Stage of International Application No. PCT/JP2019/027539 filed Jul. 11, 2019, claiming priority based on Japanese Patent Application No. 2018-162434 filed Aug. 31, 2018.

TECHNICAL FIELD

The present invention relates to a packing material for anion chromatography and a production method therefor, wherein the packing material employs a hydroxide-based eluent. In further detail, the present invention relates to a packing material employed in a column, in which a number of anions including halogen oxide ions can be analyzed, and a production method therefor.

BACKGROUND ART

Ion chromatography is an excellent analytical method for measuring ions in water. Anion chromatography in particular is widely used because a variety of anions in drinking water can be measured once.

In anion chromatography, a column packed with a packing material having a quaternary ammonium group is employed as an analytical column, and the respective anions separated by the column are detected by an electrical conductivity meter via a suppressor.

In anion chromatography, eluents comprising carbonate ions and hydroxide ions are employed as the eluent. Anion chromatography, which employs an eluent containing carbonate ions (carbonic acid-based eluent), is widely employed because of ease of handling. Several packing materials for anion chromatography which employ a carbonic acid-based eluent have been reported (refer to e.g. JP 4207362 B2 (U.S. Pat. No. 6,881,761 B2); Patent Literature 1).

Meanwhile, in anion chromatography employing an eluent containing hydroxide ions (a hydroxide-based eluent), a strongly alkaline aqueous solution such as a potassium hydroxide aqueous solution is employed in the eluent. Such hydroxide-based eluents were difficult to handle because it was necessary to prevent exposure to the solution during adjustment and utilization and also necessary to take countermeasures against change in quality due to absorption of carbon dioxide in air. However, such problems have been overcome by technical progress in an apparatus.

In anion chromatography employing a hydroxide-based eluent, it is necessary to employ a column which utilizes a packing material having durability to a strongly alkaline liquid. Pellicular type ion exchangers, for example, are known as a packing material having such a characteristic (Patent Literature 2).

A packing material with an improvement in the technique of a pellicular type ion exchanger is disclosed in Analytica Chimica Acta, 964, (2017) 187 (Non-Patent Literature 1). This literature describes an example of a packing material utilized in anion chromatography employing a hydroxide-based eluent, where 1,4-butanediol glycidyl ether was reacted with a substrate to which polyethyleneimine was bonded, for quaternization of amino groups.

CITATION LIST

Patent Literature

Patent Literature 1: JP 4207362 B2 (U.S. Pat. No. 6,881,761 B2)
Patent Literature 2: JP 4659766 B2 (WO 2005/082534 A1)

Non Patent Literature

Non Patent Literature 1: Analytica Chimica Acta, 964, (2017) 187

SUMMARY OF INVENTION

Technical Problem

The object of the present invention is to provide a packing material for a column which exhibits a higher separating performance in anion chromatography employing a hydroxide-based eluent, and a production method therefor.

Solution to Problem

As a result of keen investigation, the present inventors found that a packing material obtained by bonding a polyethyleneimine having a specific functional group, directly or through a spacer, to the surface of an organic porous substrate constituted of a crosslinked copolymer, exhibits excellent properties for use in anion chromatography employing an eluent containing hydroxide ions, thereby completing the present invention.

The present invention relates to an ion chromatography packing material, a production method of packing material for ion chromatography, and a column for ion chromatography, as shown below.

[1] A packing material for ion chromatography comprising a structure in which a polyethyleneimine is bonded, directly or through a spacer, to a surface of an organic porous substrate constituted of a crosslinked copolymer, and a functional group represented by formula (1) is bonded to a nitrogen atom derived from the aforementioned polyethyleneimine:

[Chem. 1]

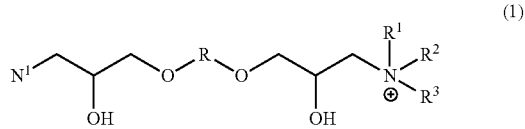

(1)

(wherein $N^1$ is a nitrogen atom derived from polyethyleneimine, R is an alkylene group selected from (1) a C1 to C10 alkylene group, (2) a C1 to C10 alkylene group having a hydroxyl group, and (3) an alkylene group in which a plurality of C2 to C4 alkylene groups are bonded by an ether bond; $R^1$, $R^2$ and $R^3$ may each be the same or different, and is a group selected from (1) a C1 to C10 alkyl group, (2) a C1 to C10 alkyl group having a hydroxyl group, and (3) a C1 to C10 alkyl group having an amino group; $R^1$ and $R^2$ may bond to form a piperidine ring, and $R^1$ and $R^2$ may bond through an oxygen atom to form a morpholine ring).

[2] The packing material for ion chromatography according to the preceding [1], wherein R is a 2-hydroxy propylene group, and at least one of $R^1$, $R^2$ and $R^3$ is a C1 to C10 alkyl group having an amino group.

[3] The packing material for ion chromatography according to the preceding [1] or [2], wherein the functional group represented by aforementioned formula (1) is represented by: formula (4) where $R^1$ and $R^2$ are methyl groups, and $R^3$ is a 2-[N-{2-(dimethylamino)ethyl-N-methyl}amino]ethyl group

[Chem. 2]

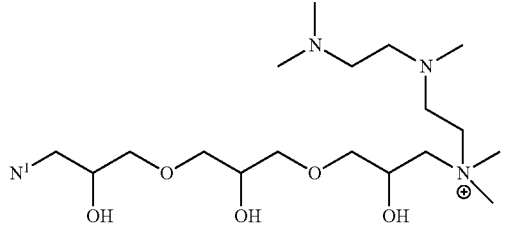

(4)

(wherein $N^1$ is a nitrogen atom derived from polyethyleneimine); formula (5) where $R^1$ is a methyl group, and $R^2$ and $R^3$ are 2-(dimethylamino)ethyl groups

[Chem. 3]

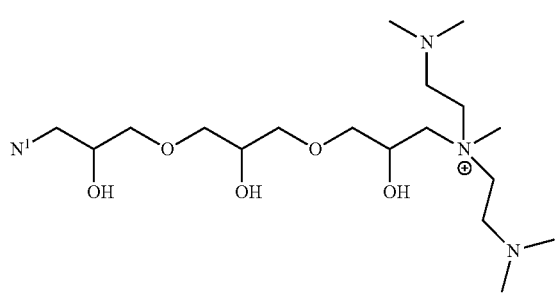

(5)

(wherein $N^1$ is a nitrogen atom derived from polyethyleneimine); or formula (6) where $R^1$ and $R^2$ form a morpholine ring by bonding through an oxygen atom, and $R^3$ is a methyl group

[Chem. 4]

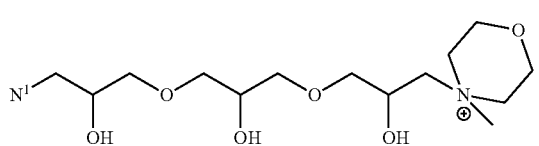

(6)

(wherein $N^1$ is a nitrogen atom derived from polyethyleneimine).

[4] The packing material for ion chromatography according to any of the preceding [1] to [3], wherein the polyethyleneimine is bonded through a spacer to a crosslinked copolymer having a hydroxyl group.

[5] The packing material for ion chromatography according to the preceding [4], wherein a crosslinked polymer has a hydroxyl group, and the spacer has a structure derived from a multifunctional glycidyl ether, or epichlorohydrin.

[6] The packing material for ion chromatography according to the preceding [5], wherein the spacer is a multifunctional glycidyl ether, and the multifunctional glycidyl ether is selected from 1,4-butanediol diglycidyl ether, ethylene glycol diglycidyl ether, polyethylene glycol diglycidyl ether, and glycerol diglycidyl ether.

[7] The packing material for ion chromatography according to the preceding [6], wherein the multifunctional glycidyl ether is 1,4-butanediol diglycidyl ether.

[8] The packing material for ion chromatography according to any of the preceding [1] to [7], wherein the crosslinked copolymer is a crosslinked polyvinyl alcohol polymer.

[9] A production method of the packing material for ion chromatography according to the preceding [1], comprising a step of bonding, directly or through a spacer, a polyethyleneimine to the surface of an organic porous substrate constituted of a crosslinked copolymer (step 1), a step of reacting a nitrogen atom contained in the polyethyleneimine with a multifunctional glycidyl ether (step 2), and a step of reacting a tertiary amine with a glycidyl group introduced in the step 2 (step 3).

[10] The production method of packing material for ion chromatography according to the preceding [9], wherein the step 1 comprises a step 1a of reacting a spacer with a crosslinked copolymer having a hydroxyl group, and a step 1b of reacting a polyethyleneimine with a spacer on the resultant crosslinked copolymer.

[11] The production method of packing material for ion chromatography according to the preceding [10], wherein the spacer is a multifunctional glycidyl ether.

[12] The production method of packing material for ion chromatography according to any of the preceding [9] to [11], wherein the spacer in the step 1a and the multifunctional glycidyl ether utilized in the step 2 are selected from 1,4-butanediol diglycidyl ether, ethylene glycol diglycidyl ether, polyethylene glycol glycidyl ether, and glycerol diglycidyl ether, and the tertiary amine in the step 3 is N,N,N',N'',N''-pentamethyl diethylene triamine.

[13] The production method of packing material for ion chromatography according to any of the preceding [9] to [12], wherein the crosslinked copolymer is a crosslinked polyvinyl alcohol copolymer.

[14] A column for ion chromatography, wherein the column is packed with the packing material according to any of the preceding [1] to [8].

Advantageous Effects of Invention

By utilizing the packing material of the present invention in a column for anion chromatography employing an eluent containing hydroxide ions, a number of anions including halogen oxide ions can be suitably separated and analyzed.

BRIEF DESCRIPTION OF DRAWINGS

FIG. 1 is a chromatogram which exhibits the result of Analytical Example 1 in which an anion-containing standard solution was analyzed using an inventive packing material 1 for ion chromatography.

FIG. 2 is a chromatogram which exhibits the result of Analytical Comparative Example 1 in which an anion-containing standard solution was analyzed using a comparative packing material for ion chromatography.

FIG. 3 is a chromatogram which exhibits the result of Analytical Example 2 in which an anion-containing standard solution was analyzed using an inventive packing material 2 for ion chromatography.

DESCRIPTION OF EMBODIMENTS

The packing material for ion chromatography according to the present invention comprises a structure wherein: a polyethyleneimine is bonded, directly or through a spacer, to the surface of an organic porous substrate constituted of a crosslinked copolymer; and a functional group of a specific structure is bonded to a nitrogen atom derived from polyethyleneimine. The polyethyleneimine is a polymer having —(CH$_2$—CH$_2$-NA)- (wherein A is a hydrogen atom (H) or a "repeating base unit") as a repeating base unit. Moreover, the crosslinked copolymer has a functional group which reacts with the polyethyleneimine or spacer.

The aforementioned functional group of specific structure contained in the packing material of the present invention is represented by formula (1).

[Chem. 5]

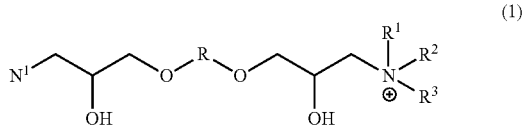

(1)

In the formula, N$^1$ is a nitrogen atom derived from polyethyleneimine, R is an alkylene group selected from (1) a C1 to C10 alkylene group, (2) a C1 to C10 alkylene group having a hydroxyl group, and (3) an alkylene group in which a plurality of C2 to C4 alkylene groups are bonded by an ether bond, R$^1$, R$^2$ and R$^3$ are (1) a C1 to C10 alkyl group, (2) a C1 to C10 alkyl group having a hydroxyl group, or (3) a C1 to C10 alkyl group having an amino group. R may be a differing plurality of alkylene groups, and R$^1$, R$^2$ and R$^3$ may each be the same or different. Moreover, two of R$^1$, R$^2$ and R$^3$ may bond to form a ring structure. R$^1$ and R$^2$ may bond to form a piperidine ring, and R$^1$ and R$^2$ may bond through an oxygen atom to form a morpholine ring.

Production Method of Packing Material for Ion Chromatography:

The production method of the packing material for ion chromatography according to the present invention comprises a step of bonding, directly or through a spacer, a polyethyleneimine to the surface of an organic porous substrate constituted of a crosslinked copolymer (step 1), a step of reacting a nitrogen atom contained in the polyethyleneimine with a multifunctional glycidyl ether (step 2), and a step of reacting a tertiary amine with a glycidyl group introduced in the step 2 (step 3). When bonding a polyethyleneimine through the spacer in the step 1, the step 1 includes a step 1a of reacting the spacer with the crosslinked copolymer and a step 1b of reacting the polyethyleneimine and the spacer.

Step 1:

A step of bonding, directly or through a spacer, a polyethyleneimine to the surface of an organic porous substrate constituted of a crosslinked copolymer A polystyrene-based substrate, a polymethacrylate-based substrate, or a polyvinyl alcohol-based substrate is utilized as the organic porous substrate constituted of a crosslinked copolymer. It is necessary for the aforementioned organic porous substrate to have a functional group which reacts with the amino group of the polyethyleneimine or a functional group of the spacer. An organic porous substrate may also be obtained by copolymerizing a monomer having a functional group which reacts with an amino group (e.g., glycidyl methacrylate (GMA), chloromethyl styrene) with a principal monomer so as to react the polyethyleneimine. Moreover, when using a spacer, an organic porous substrate may also be obtained by copolymerizing a monomer having a functional group which reacts with the spacer (e.g., a monomer having a hydroxyl group such as hydroxybutyl methacrylate) or a monomer having a functional group which could change to a reacting functional group (e.g., vinyl acetate which produces a hydroxyl group by hydrolysis, or vinyl amide which produces an amino group by hydrolysis) with a principal monomer.

There are basically no constraints on the polymerization method of the organic porous substrate employed in the present invention, and a suspension polymerization method can be employed. Moreover, polymerization is possible by, for example, an SPG membrane suspension polymerization method employing a Shirasu Porous Glass (SPG) membrane with a controlled pore diameter and an internal pressure type micro kit MN-20 (made by SGP Technology Co., Ltd.), or a microchannel suspension polymerization method employing a microchannel emulsification apparatus (made by Eco Project Technologies Co., Ltd.). Known methods may also be employed without constraints on the method of imparting porosity. Generally, a porous substrate is obtainable by copolymerization in a condition where a solvent (diluent), which dissolves a monomer but does not dissolve a copolymer substance, was added to the monomer. As the diluent, aromatic hydrocarbons such as chlorobenzene, toluene, xylene, diethyl benzene, and dodecyl benzene, saturated hydrocarbons such as hexane, heptane, and decane, alcohols such as isoamyl alcohol, hexyl alcohol, and octyl alcohol, acetic acid esters such as butyl acetate, amyl acetate, and the like can be used alone or a plurality can be used in combination.

Moreover, after polymerization, classification is carried out by means of sieves or classification devices (for example, a semi-free vortex type air classifier Aerofine Classifier AC, made by Nisshin Engineering Inc.), so as to adjust the average particle diameter, homogeneity, and fine particle content.

The packing material for ion chromatography is preferably formed from a substrate which does not change under strongly alkaline eluent conditions. Therefore, a polystyrene-based substrate, or a polyvinyl alcohol-based substrate is preferable as the organic porous substrate for packing material. If the substrate is greatly hydrophobic, then unfavorable interactions may be exhibited with respect to the hydrophobic anions, hence substrates with low hydrophobicity are preferred. From this perspective, organic porous polyvinyl alcohol-based materials constituted of a crosslinked copolymer containing a hydroxyl group are especially preferred.

The polyvinyl alcohol-based substrate comprises a crosslinked polyvinyl alcohol polymer. The crosslinked polyvinyl alcohol polymer may be synthesized by post-crosslinking of the polyvinyl alcohol, or be synthesized by copolymerization. If synthesizing by copolymerization, then a crosslinked monomer is copolymerized with vinyl ester, and the ester portion of the resultant copolymer is hydrolyzed. Vinyl acetate and triallylisocyanurate are preferred as the combination of vinyl ester and crosslinked monomer.

If the polyethyleneimine is directly bonded, then the polyethyleneimine is bonded to a substrate by a reaction with a glycidyl group or a chloro group, derived from a monomer of an organic porous substrate constituted of a crosslinked copolymer. A branched or straight chain polyethyleneimine may be employed as the polyethyleneimine.

A branched polyethyleneimine is more preferable. A polyethyleneimine with a molecular weight of 300 to 10000 may be utilized, and a molecular weight of 600 to 1800 is more preferable.

The reaction takes place by stirring, under heating, a crosslinked copolymer having a glycidyl group or chloro group and the polyethyleneimine in a solvent.

If the aforementioned crosslinked copolymer has no functional group, since the polyethyleneimine cannot be directly bonded, an amino group or hydroxyl group of a crosslinked copolymer is used to bond the polyethyleneimine through a spacer. A compound having a functional group which reacts with the organic porous substrate, and a functional group which reacts with the polyethyleneimine may be utilized as the spacer. For example, since a polyvinyl alcohol-based substrate has a hydroxyl group on the surface thereof, it may be suitably utilized in a method of employing a spacer.

A multifunctional glycidyl ether or epichlorohydrin may be suitably employed as the compound for the spacer. 1,4-butanediol diglycidyl ether (sometimes abbreviated to 1,4-BGE), ethylene glycol diglycidyl ether, polyethylene glycol glycidyl ether, and glycerol diglycidyl ether can be mentioned as the multifunctional glycidyl ether. However, 1,4-BGE and glycerol diglycidyl ether are preferred, and 1,4-BGE is more preferable.

Step 1a:

The reaction of a spacer with a crosslinked copolymer having an amino group or a hydroxy group takes place in a nonpolar solvent, by addition reaction of the glycidyl group of the spacer with the amino group or a hydroxyl group in the polymer.

The reaction of crosslinked polyvinyl alcohol polymer and multifunctional glycidyl ether takes places as follows, for example. Namely, a crosslinked polyvinyl alcohol polymer is dispersed in an aprotic polar solvent, and stirred together with a multifunctional glycidyl ether. Here, an alkali is put in and stirred. The reaction temperature at this time is preferably 40 to 70° C. Dimethyl sulfoxide (DMSO) is preferred as the aprotic polar solvent.

Step 1b:

The polyethyleneimine is bonded to the crosslinked copolymer by reaction with the glycidyl group derived from the spacer. A branched or straight chain polyethyleneimine may be utilized as the polyethyleneimine. A branched polyethyleneimine is more preferable. A polyethyleneimine with a molecular weight of 300 to 10000 may be utilized, and a molecular weight of 600 to 1800 is more preferable.

Water may be suitably utilized as this reaction solvent. The amount of water is preferably about 5 times by mass to that of the substrate. The polyethyleneimine to react is preferably about 0.6 times by mass to that of the substrate. The reaction temperature is preferably 40 to 80° C., and 50 to 70° C. is more preferable.

Step 2:

This is a step of bonding a multifunctional glycidyl ether to a nitrogen atom contained in the polyethyleneimine by reacting a specific multifunctional glycidyl ether to the amino group of the polyethyleneimine which is bonded, directly or through a spacer, to the surface of an organic porous substrate constituted of a crosslinked copolymer. A substrate is obtainable according to the present step, where the substrate has on the surface, a structure to which a functional group represented by the following formula (2) is bonded (this substrate is sometimes abbreviated to "epoxy substrate").

[Chem. 6]

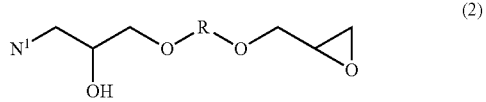

(2)

In the formula, $N^1$ is a nitrogen atom derived from polyethyleneimine, and R is an alkylene group selected from (1) C1 to C10 alkylene group, (2) C1 to C10 alkylene group having a hydroxyl group, and (3) an alkylene group in which a plurality of C2 to C4 alkylene groups are bonded by an ether bond.

In formula (2), an ethylene group, propylene group, butylene group, and neopentylene group can be mentioned as specific examples of the C1 to C10 alkylene group represented by R. A 2-hydroxy propylene group, 2-hydroxy, and 2-methyl propylene group can be mentioned as specific examples of the C1 to C10 alkylene group having a hydroxyl group. A diethylene glycol group and a polyethylene glycol group can be mentioned as the alkylene group in which a plurality of C2 to C4 alkylene groups are bonded by an ether bond. Amongst these, butylene and 2-hydroxy propylene are preferred, and 2-hydroxy propylene is especially preferred.

Represented by formula (3) is the specific multifunctional glycidyl ether to which a functional group represented by formula (2) is bonded.

[Chem. 7]

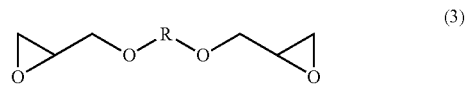

(3)

In the formula, R means the same as the R of formula (2).

The epoxy substrate is obtainable by stirring and heating, in water, the crosslinked polymer to which the polyethyleneimine was bonded and the multifunctional glycidyl ether. The reaction temperature is preferably 40 to 80° C., and more preferably 50 to 70° C.

Step 3:

This is a step of obtaining a packing material having a structure where a functional group represented by formula (1) is bonded by quaternization of a nitrogen atom of a tertiary amine by reacting the tertiary amine represented by $NR^1R^2R^3$ with the glycidyl group of the epoxy substrate obtained in the step 2.

[Chem. 8]

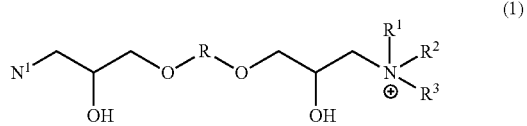

(1)

In the formula, $N^1$ is a nitrogen atom derived from polyethyleneimine, and R is an alkylene group selected from (1) C1 to 10 alkylene group, (2) a C1 to 10 alkylene group having a hydroxyl group, and (3) an alkylene group in which a plurality of C2 to 4 alkylene groups are bonded by an ether bond. $R^1$, $R^2$ and $R^3$ may each be the same or different, and is a group selected from (1) C1 to C10 alkyl group, (2) a C1 to C10 alkyl group having a hydroxyl group, and (3) a C1 to C10 alkyl group having an amino group. $R^1$ and $R^2$ may bond to form a piperidine ring, and $R^1$ and $R^2$ may bond through an oxygen atom to form a morpholine ring.

Specific examples of the (1) C1 to C10 alkyl group, (2) C1 to 10 alkyl group having a hydroxyl group, and (3) C1 to C10 alkyl group having an amino group, which $R^1$, $R^2$ and $R^3$ represent, include a methyl group, ethyl group, propyl group, 2-hydroxy ethyl group, 3-hydroxy propyl group, 2-(dimethylamino)ethyl group, 2-(diethylamino)ethyl group, and 3-(dimethylamino)propyl group. If the carbon number is 10 or under, then the hydrophobicity of the packing material will not become too high. The carbon number is preferably 7 or under. It is preferable for one of $R^1$, $R^2$ and $R^3$ to be different. It is moreover preferable for at least one of $R^1$, $R^2$ and $R^3$ to be an alkyl group having an amino group.

Amongst these, the following combinations are preferred: $R^1$ and $R^2$ are methyl groups, and $R^3$ is a 2-[N-{2-(dimethylamino)ethyl-N-methyl}amino]ethyl group; $R^1$ is a methyl group, and $R^2$ and $R^3$ are 2-(dimethylamino)ethyl groups; or $R^1$ and $R^2$ are bonded to form a morpholine ring through an oxygen atom, and $R^3$ is a methyl group. Combinations thereof are exhibited in formulae (4), (5) and (6).

[Chem. 9]

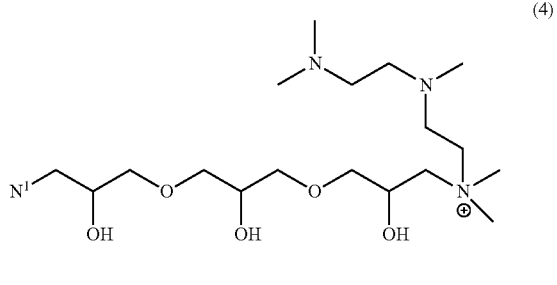

(4)

[Chem. 10]

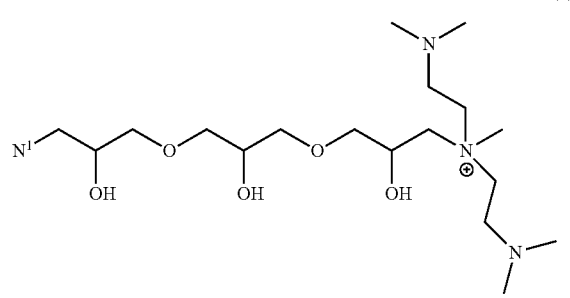

(5)

[Chem. 11]

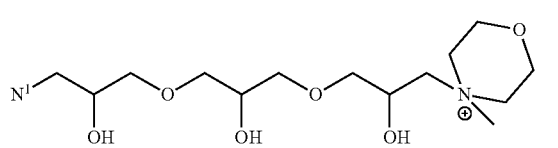

(6)

In the aforementioned formulae, $N^1$ is a nitrogen atom derived from polyethyleneimine.

Although Analytica Chimica Acta, 964, (2017) 187 (Non-Patent Literature 1) discloses that trimethylamine is reacted with a substrate equivalent to an epoxy substrate, also described therein is that there were no changes in the ion retention or ion capacity by reaction with trimethylamine. However, upon investigation, the present inventors confirmed a change in the properties of a packing material by reaction of tertiary amine, and a suitable change in ion retention conditions in a column utilizing a resultant packing material. The reasons for the good result can be due to employing a compound having a plurality of amino groups as the tertiary amine, employing glycerol diglycidyl ether as the multifunctional glycidyl ether, or synergistic effect of combination of these. Although the true reason is unknown, in any event, upon investigation by the present inventors, it has now become possible to obtain a packing material having a suitable performance, which has not been known until now.

In the step 3, an amine having the alkyl groups corresponding to $R^1$ to $R^3$ in formula (1) is utilized as the tertiary amine represented by $NR^1R^2R^3$. Specifically, cyclic amines such as trimethylamine, triethylamine, dimethyl ethylamine, methyl diethanolamine, 2-dimethylaminoethanol, N-methyl piperidine, N-methyl morpholine; and multifunctional tertiary amines such as tetramethyl ethylenediamine, tetraethyl ethylenediamine, N,N,N',N'',N''-pentamethyl diethylenetriamine (hereinunder may be abbreviated to PMTA) may be utilized. Amongst these, PMTA is preferred because of improved gel strength due to crosslinkability or suitable hydrophilicity.

As a result of the reaction of this epoxy substrate and tertiary amine, a structure represented by the following formula (7) is also partially formed at the same time.

[Chem. 12]

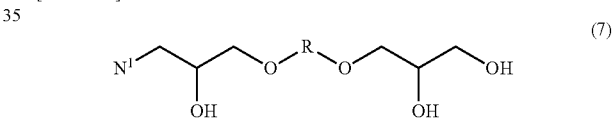

(7)

(In the formula, $N^1$ and R have the same meaning as those of the aforementioned.)

The hydrophilicity of the packing material increases or decreases depending on the increase or decrease of the structure of formula (7). Moreover, various forms of amino groups which are derived from polyethyleneimine exist on the surface of the epoxy substrate. The glycidyl group of the epoxy substrate in such conditions is unstable over time, and this is also regarded to gradually change to the structure of formula (7). Therefore, it is necessary to perform the step 3 rapidly after the step 2.

The reaction of epoxy substrate and tertiary amine takes place in the following manner. Namely, the epoxy substrate is dispersed in a solvent, an amine is added thereto, and the resultant mixture is reacted by heating. Water is preferred as the solvent. The amount of water is preferably 8 to 10 times the amount by mass to the epoxy substrate. Regarding the amount of amines, a reaction liquid is added as an aqueous solution to become 2.5 to 4.5% by weight. The reaction temperature is preferably 40 to 80° C., and more preferably 60 to 80° C. These reactions can be implemented by selecting the conditions so that a suitable packing material is obtainable.

In the most preferred embodiment, the packing material of the present invention comprises a structure where the functional group represented by aforementioned formula (4) or (5) is bonded to the surface of a substrate.

It is considered that, at this time, a crosslinked structure is naturally formed, in which three amino groups of PMTA react with a plurality of epoxy groups of the epoxy substrate simultaneously. Such structure is effective since the strength and durability of the packing material are enhanced.

Alkaline treatment may be carried out on packing material obtained by reaction in order to enhance the stability with respect to the alkaline eluent. The alkaline treatment takes place by stirring under heating in an alkaline aqueous solution. This alkaline treatment is implemented in order to make fine adjustments to the retention time of the column obtainable from the packing material, or in order for a column to indicate a stabilized baseline.

Although there are no particular restrictions on the size of the packing material according to the present invention, when considering the packing of the column as well as the separating performance, an average particle diameter of 2.5 to 5.0 µm is preferred. If the average particle diameter is 5.0 µm or lower, then the separating ability of a compound is high, and good analysis results can be obtained. If less than 2.5 µm, then the pressure of the column becomes high, and packing is difficult. An average particle diameter of 3.0 to 5.0 µm is further preferable, but to obtain a column with a high separating ability, 3.5 µm or more and less than 5.0 µm is the most preferable.

The average particle diameter described in the present specification means the volume average particle diameter as follows. Namely, 2000 or more copolymer particles are imaged with a particle size distribution measuring device, and the equivalent circular diameter (circular diameter having the same area as the projection area of the particle image) of each particle is obtained from the resultant two-dimensional particle image (static image is preferred). The volume of each particle is calculated from the equivalent circular diameters thereof, and the calculated volume is averaged to obtain a particle diameter. At this time, each particle is deemed to be a spherical body having the same diameter as the aforementioned equivalent circular diameter.

FPIA-3000 (made by Sysmex Corporation) and the like can be employed as the particle size distribution measurement apparatus.

The ion chromatography column of the present invention is obtainable by packing the packing material of the present invention into a column by known packing methods such as a slurry method.

The material of the enclosure of the ion chromatography column of the present invention is preferably polyether ether ketone resin (PEEK).

EXAMPLE(S)

The present invention is explained in further detail below by analytical examples utilizing the packing materials of the examples and comparative examples. However, the present invention is not restricted in any way by the following description.

Example 1: Production of Packing Material for Ion Chromatography

[Previous step]
Preparation of a Crosslinked Polyvinyl Alcohol Polymer:

A homogeneous mixed liquid including 100 g of vinyl acetate, 150 g of triallyl isocyanurate, 100 g of butyl acetate, 25 g of n-decane, and 10 g of 2,2-azobisisobutyronitrile, together with 1200 mL of water in which 12 g of polyvinyl alcohol and 18 g of disodium hydrogen phosphate were dissolved, were put into a 5 L three-necked flask equipped with a recirculating cooler and were stirred for 10 minutes. Then, polymerization was carried out at 60° C. for 16 hours whilst stirring under a nitrogen gas stream to obtain a granular crosslinked copolymer. This copolymer was filtered and washed, acetone extraction was carried out, and then was dried. Next, this crosslinked copolymer together with 3 L of caustic soda, were put into a 5 L three-necked flask equipped with a recirculating cooler, a nitrogen introduction tube and a stirrer. This was stirred under a nitrogen gas stream at 15° C. for 20 hours, where saponification of the crosslinked polymer took place. This was then filtered and washed with water, further dried, and then underwent air classification to obtain a crosslinked polyvinyl alcohol polymer, as the organic porous substrate comprised of a crosslinked polymer. The density of the hydroxyl group of the crosslinked polyvinyl alcohol polymer was 2.1 meq/g. The density of the hydroxyl group was calculated from the difference in the mass between the polymer obtainable after acetylating the dried crosslinked polyvinyl alcohol polymer with acetyl chloride and trimethylamine and then washing and drying, and the initial crosslinked polyvinyl alcohol polymer.

[Step 1a]
Introduction of a Spacer (Multifunctional Glycidyl Ether):

100 g of the aforementioned crosslinked polyvinyl alcohol polymer, 150 g of 1,4-butanediol diglycidyl ether (1,4-BGE), 300 mL of dimethyl sulfoxide, and 65 mL of a 30% by weight sodium hydroxide aqueous solution were put into a 1 L three-necked flask equipped with a nitrogen introduction tube and a stirrer, and stirred under a nitrogen gas stream at 50° C. for 2 hours in order to react the spacer with the polymer. The polymer after reaction was washed with dimethyl sulfoxide and water, and then employed as-is in the next reaction.

[Step 1b]
Polyethyleneimine Introduction:

The entire amount of the polymer in which a spacer was introduced as obtained in the step 1a, 30 g of polyethyleneimine (made by FUJIFILM Wako Pure Chemical Corporation, average molecular weight: about 1800), and 400 mL of water were put into a 1 L three-necked flask equipped with a nitrogen introduction tube and a stirrer, and were stirred under a nitrogen gas stream at 60° C. for 18 hours, thus reacting the amino group of the polyethyleneimine with the glycidyl group derived from the spacer. A substrate obtained by the reaction was filtered and washed, acetone washed and then dried, to obtain a substrate where the polyethyleneimine was introduced.

[Step 2]
Reaction of Polyethyleneimine and Multifunctional Glycidyl Ether:

5.5 g of the substrate in which the polyethyleneimine was introduced as obtained in the step 1b, 3.33 g of glycerol diglycidyl ether, and 50 mL of water were put into a 100 mL three-necked flask equipped with a nitrogen introduction tube and a stirrer, and were stirred under a nitrogen gas stream at 75° C. for 2 hours, thus reacting the polyethyleneimine and multifunctional glycidyl ether, and the glycidyl group was introduced to the substrate to obtain an epoxy substrate 1. The epoxy substrate after reaction was filtered and washed, and employed as-is in the next reaction.

[Step 3]
Quaternization by Reaction with a Tertiary Amine:

The entire amount of the epoxy substrate 1 obtained in the step 2, 150 µL of N,N,N',N'',N''-pentamethyl diethylene triamine (PMTA), and 40 mL of water were put into a 100 mL three-necked flask equipped with a nitrogen introduction tube and a stirrer, and were stirred under a nitrogen gas stream at 75° C. for 2 hours, and PMTA was introduced and quaternized to obtain a packing material.

[Alkaline Treatment]

The aforementioned packing material and 40 mL of 1N NaOH were put into a 100 mL three-necked flask equipped with a nitrogen gas introduction tube and a stirrer, and were stirred under a nitrogen gas stream at 60° C. for 16 hours. The packing material after reaction was filtered and washed with water to obtain a packing material 1 for ion chromatography.

The packing material 1 for ion chromatography obtained above was packed into a column made of polyether ether ketone resin (PEEK) with an internal diameter of 4.0 mm and a length of 150 mm to prepare an anion exchange column 1.

Analytical Example 1

20 µL of an aqueous solution containing 0.5 mg/L of $F^-$, 1 mg/L of acetic acid, 1 mg/L of formic acid, 5 mg/L of $ClO_2^-$, 5 mg/L of $BrO_3^-$, 3 mg/L of $Cl^-$, 5 mg/L of $NO_2^-$, 1 mg/L of dichloroacetic acid, 30 mg/L of carbonic acid, 10 mg/L of $ClO_3^-$, 10 mg/L of $Br^-$, 10 mg/L of $SO_4^{2-}$, 10 mg/L of $NO_3^-$, and 20 mg/L of $PO_4^{3-}$ was injected into the anion exchange column 1 prepared in Example 1 and was analyzed under the following conditions. The result is shown in FIG. 1:

Eluent: 25 mM KOH;
Flow rate: 1 mL/min;
Detector: CDD-10 Avp (made by Shimadzu Corporation), and
Temperature: 30° C.

In FIG. 1, 1 shows the peak of $F^-$, 2 shows the peak of acetic acid ions, 3 shows the peak of formic acid ions, 4 shows the peak of $ClO_2^-$, 5 shows the peak of $BrO_3^-$, 6 shows the peak of $Cl^-$, 7 shows the peak of $NO_2^-$, 8 shows the peak of dichloroacetic acid, 9 shows the peak of carbonic acid ions, 10 shows the peak of $ClO_3^-$, 11 shows the peak of $Br^-$, 12 shows the peak of $SO_4^{2-}$, 13 shows the peak of $NO_3^-$, and 14 shows the peak of $PO_4^{3-}$. As is understood from FIG. 1, the packing material according to Example 1 provided a column which could suitably separate many ions including halogen oxide ions.

Comparative Analytical Example 1

Except for not reacting the tertiary amine, a packing material 1 for comparison was obtained in the same way as Example 1, and a column 2 was prepared. 20 µL of an aqueous solution containing 0.5 mg/L of $F^-$, 5 mg/L of $ClO_2^-$, 3 mg/L of $Cl^-$, 5 mg/L of $NO_2^-$, 10 mg/L of $Br^-$, 10 mg/L of $SO_4^{2-}$ 10 mg/L of $NO_3^-$, 10 mg/L of $ClO_3^-$, and 20 mg/L of $PO_4^{3-}$ was injected into the column 2, and analysis was conducted under the following analysis conditions. The result is shown in FIG. 2:

Eluent: 23 mM KOH;
Flow rate: 1 mL/min;
Detector: CDD-10 Avp (made by Shimadzu Corporation);
Temperature: 30° C.; and
Sample: 20 µL Each of the peak numbers in FIG. 2 exhibits the same ions as those in FIG. 1. As is understood from FIG. 2, in the case of packing material 1 for comparison where a tertiary amine is not made to react, the retention was weak, and except for 7, the separation of the peaks was insufficient.

Example 2

The previous step, the step 1a, and the step 1b were implemented in the same way as in Example 1.

[Step 2]

Reaction of Polyethyleneimine and Multifunctional Glycidyl Ether:

10.0 g of the substrate to which the resultant polyethyleneimine was introduced as obtained in the step 1b, 29.51 g of glycerol diglycidyl ether, and 90 mL of water were put into a 300 mL three-necked flask equipped with a nitrogen introduction tube and stirrer, and were stirred under a nitrogen gas stream at 50° C. for 2 hours, then reacting the polyethyleneimine and multifunctional glycidyl ether, and the glycidyl group was introduced to the substrate to obtain an epoxy substrate 1. The epoxy substrate after reaction was filtered and washed, and employed as-is in the next reaction.

[Step 3]

Quaternization by Reaction with a Tertiary Amine:

The entire amount of the epoxy substrate 1 obtained in the step 2, 680 µL of N-methyl morpholine, and 95 mL of water were put into a 300 mL three-necked flask equipped with a nitrogen introduction tube and a stirrer, and were stirred under a nitrogen gas stream at 65° C. for 2 hours, and then N-methyl morpholine was introduced and quaternized to obtain a packing material.

[Alkaline Treatment]

The aforementioned packing material and 60 mL of 1N NaOH were put into a 100 mL three-necked flask equipped with a nitrogen gas introduction tube and a stirrer, and were stirred under a nitrogen gas stream at 60° C. for 16 hours. The packing material after reaction was filtered and washed with water to obtain a packing material 2 for ion chromatography.

The packing material 2 for ion chromatography obtained above was packed into a column made of polyether ether ketone resin (PEEK) with an internal diameter of 4.0 mm and a length of 150 mm to prepare an anion exchange column 3.

Analytical Example 3

The analysis conditions were the same as those of Analytical Example 1, except that the anion exchange column 3 prepared in Example 2 was employed and that 23 mM KOH of eluent, a flow rate of 0.5 mL/min, and the detector DIONEX INTEGRION HPIC (made by Thermo Fisher Scientific) were used. 25 µL of the same aqueous solution (containing 13 types of anions) as the aqueous solution injected in Analytical Example 1, except for not including dichloroacetic acid, was injected and analyzed. The result is shown in FIG. 3.

Each of the peak numbers in FIG. 3 exhibits the same ions as those in FIG. 1. As is understood from FIG. 3, the packing material according to Example 2 provided a column which could suitably separate many ions including halogen oxide ions.

The invention claimed is:

1. A packing material for ion chromatography comprising a structure in which a polyethyleneimine is bonded, directly or through a spacer, to a surface of an organic porous substrate comprising a crosslinked copolymer, and a functional group represented by formula (1) is bonded to a nitrogen atom of the polyethyleneimine:

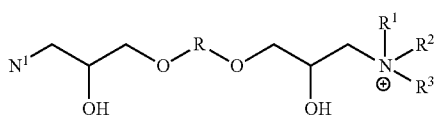
(1)

(wherein $N^1$ is a nitrogen atom of the polyethyleneimine, R is an alkylene group selected from (1) an unsubstituted C1 to C10 alkylene group, (2) a C1 to C10 alkylene group having a hydroxyl group, and (3) an alkylene group in which a plurality of C2 to C4 alkylene groups are bonded by an ether bond, and $R^1$, $R^2$ and $R^3$ are the same or different and represent a group selected from (1) an unsubstituted C1 to C10 alkyl group, (2) a C1 to C10 alkyl group having a hydroxyl group, and (3) a C1 to C10 alkyl group having an amino group.

2. The packing material for ion chromatography according to claim 1, wherein R is a 2-hydroxy propylene group, and at least one of $R^1$, $R^2$ and $R^3$ is a C1 to C10 alkyl group having an amino group.

3. The packing material for ion chromatography according to claim 2, wherein the functional group represented by the formula (1) is also represented by formula (4)

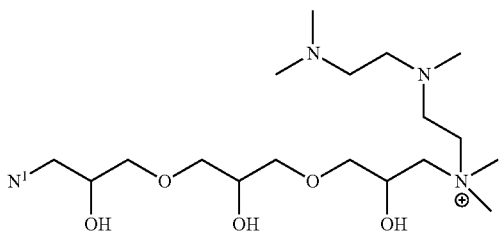
(4)

(wherein $N^1$ is a nitrogen atom of the polyethyleneimine);

formula (5)

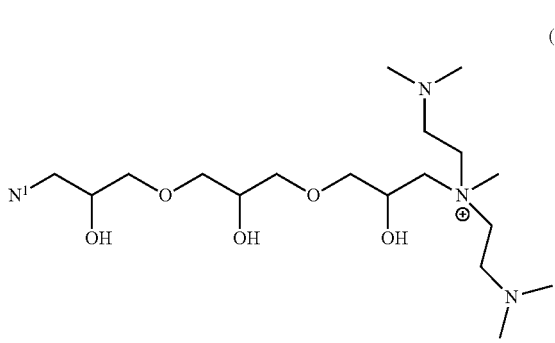
(5)

(wherein $N^1$ is a nitrogen atom of the polyethyleneimine); or formula (6)

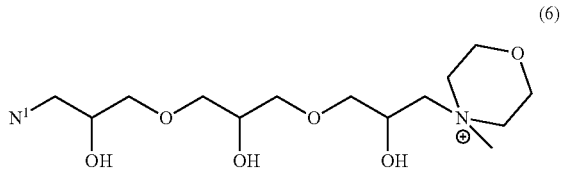
(6)

(wherein $N^1$ is a nitrogen atom of the polyethyleneimine).

4. The packing material for ion chromatography according to claim 1, wherein the functional group represented by the formula (1) is also represented by formula (4)

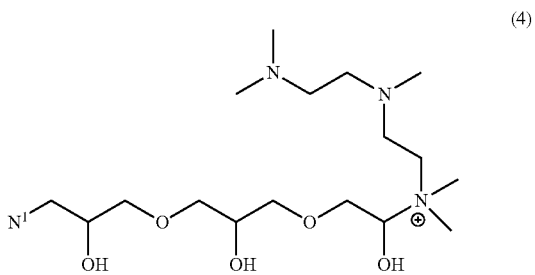
(4)

(wherein $N^1$ is a nitrogen atom of the polyethyleneimine);

formula (5)

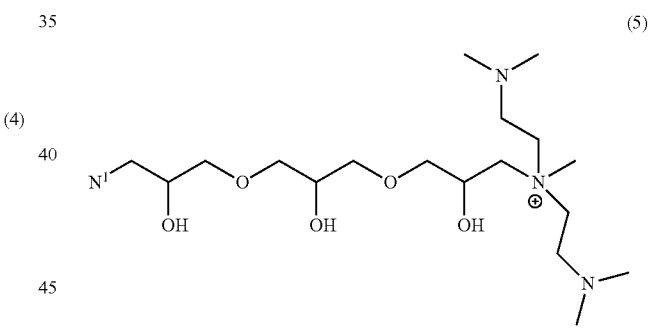
(5)

(wherein $N^1$ is a nitrogen atom of the polyethyleneimine); or formula (6)

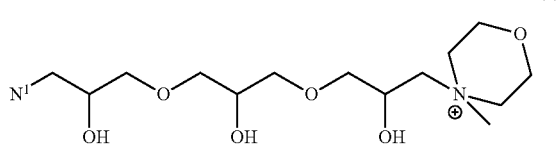
(6)

(wherein $N^1$ is a nitrogen atom of the polyethyleneimine).

5. The packing material for ion chromatography according to claim 1, wherein the polyethyleneimine is bonded through a spacer to the crosslinked copolymer.

6. The packing material for ion chromatography according to claim 5, wherein the crosslinked copolymer has a hydroxyl group, and the spacer has a structure obtained from a multifunctional glycidyl ether or epichlorohydrin.

7. The packing material for ion chromatography according to claim 6, wherein the spacer is obtained from a multifunctional glycidyl ether, and the multifunctional glycidyl ether is selected from 1,4-butanediol diglycidyl ether, ethylene glycol diglycidyl ether, polyethylene glycol diglycidyl ether, and glycerol diglycidyl ether.

8. The packing material for ion chromatography according to claim 7, wherein the multifunctional glycidyl ether is 1,4-butanediol diglycidyl ether.

9. The packing material for ion chromatography according to claim 1, wherein the crosslinked copolymer is a crosslinked polyvinyl alcohol copolymer.

10. A production method of the packing material for ion chromatography according to claim 1, comprising a step of bonding, directly or through a spacer, the polyethyleneimine to the surface of an organic porous substrate comprising a crosslinked copolymer (step 1), a step of reacting a nitrogen atom contained in the polyethyleneimine with a multifunctional glycidyl ether (step 2), and a step of reacting a tertiary amine with the glycidyl group introduced in the step 2 (step 3).

11. The production method of packing material for ion chromatography according to claim 10, wherein the step 1 comprises a step 1a of reacting a spacer with a crosslinked copolymer having a hydroxyl group and a step 1b of reacting the polyethyleneimine with the spacer on the resultant crosslinked copolymer.

12. The production method of packing material for ion chromatography according to claim 11, wherein the spacer is a multifunctional glycidyl ether.

13. The production method of packing material for ion chromatography according to claim 12, wherein the spacer of the step 1a is 1,4-butanediol diglycidyl ether and the multifunctional glycidyl ether utilized in the step 2 is selected from 1,4-butanediol diglycidyl ether, ethylene glycol diglycidyl ether, polyethylene glycol glycidyl ether, and glycerol diglycidyl ether, and the tertiary amine of the step 3 is N,N,N',N'',N''-pentamethyl diethylene triamine.

14. The production method of packing material for ion chromatography according to claim 13, wherein the multifunctional glycidyl ether utilized in the step 2 is glycerol diglycidyl ether.

15. The production method of packing material for ion chromatography according to claim 11, wherein the multifunctional glycidyl ether utilized in the step 2 is selected from 1,4-butanediol diglycidyl ether, ethylene glycol diglycidyl ether, polyethylene glycol glycidyl ether, and glycerol diglycidyl ether, and the tertiary amine of the step 3 is N,N,N',N'',N''-pentamethyl diethylene triamine.

16. The production method of packing material for ion chromatography according to claim 11, wherein the spacer of the step 1a and the multifunctional glycidyl ether utilized in the step 2 are each selected from 1,4-butanediol diglycidyl ether, ethylene glycol diglycidyl ether, polyethylene glycol glycidyl ether, and glycerol diglycidyl ether, and the tertiary amine of the step 3 is N,N,N',N'',N''-pentamethyl diethylene triamine.

17. The production method of packing material for ion chromatography according to claim 10, wherein the crosslinked copolymer is a crosslinked polyvinyl alcohol copolymer.

18. A column for ion chromatography, wherein the column is packed with the packing material according to claim 1.

19. The packing material for ion chromatography according to claim 1, wherein $R^1$ and $R^2$ are bonded to form a piperidine ring.

20. The packing material for ion chromatography according to claim 1, wherein $R^1$ and $R^2$ are bonded through an oxygen atom to form a morpholine ring.

* * * * *